United States Patent Office 3,663,516
Patented May 16, 1972

---

3,663,516
POLYURETHANE PRODUCT AND METHOD OF PRODUCING SAME
Herwart C. Vogt, Grosse Ile, Mich., assignor to BASF Wyandotte Corporation, Wyandotte, Mich.
No Drawing. Original application July 3, 1967, Ser. No. 650,590, now Patent No. 3,522,304, dated July 28, 1970. Divided and this application Apr. 30, 1970, Ser. No. 43,634
Int. Cl. C08g 22/16
U.S. Cl. 260—77.5 AQ
1 Claim

ABSTRACT OF THE DISCLOSURE

A polyurethane product and method of producing same by coreacting a mixture of an organic polyisocyanate and polyhydroxy diurea. The polyhydroxy diurea in turn comprises the reaction product of a primary or secondary alkanolamine with a compound selected from the group consisting of diisocyanates and dicarbonyl chlorides, the latter being the reaction product of a primary or secondary diamine with phosgene.

---

This is a division of application Ser. No. 650,590, filed July 3, 1967 now U.S. Pat. No. 3,522,304.

In general, the art has developed various methods of manufacturing polyurethanes. The preparation of polyurethanes is disclosed in many references, including the texts entitled "Polyurethanes" by Bernard A. Dombrow, published by Reinhold Publishing Corporation, New York, New York, 1957, and "Polyurethanes: Chemistry and Technology" by J. H. Saunders and K. C. Frisch, published by Interscience Publishers, New York–London, wherein disclosures are made of methods for producing polyurethanes.

Polyurethane compositions are usually regarded as the reaction product of a polyisocyanate and an active hydrogen-containing organic compound such as a hydroxy-terminated polyester, polyesteramine, amide, or polyether.

In the prepolymer method of manufacturing polyurethanes, the polyisocyanate in stoichiometric excess is first reacted with an active hydrogen-containing organic compound whereby a "prepolymer" is formed. The prepolymer is then reacted with active hydrogen-containing material such as water, diamines, polyethers, etc., whereupon the prepolymer polymerizes and cross-links as a result of the reaction of the excess polyisocyanate with the active hydrogen-containing material.

A desirable material for some urethane applications is piperazine, the heterocyclic structure imparting restricted rotation to the chain which, therefore, introduces a degree of rigidity to the skeleton, while the urea linkage with a high degree of secondary bond forces greatly adds to the over-all strength properties. However, piperazines, such as 2-methylpiperazine, or other primary or secondary diamines are often plagued by reacting too rapidly with an isocyanate group to permit accurate control of the reaction. Thus, it is desirable to have a material which combines the desirable properties of piperazine for such urethane applications with accurate control of the reaction.

Accordingly, it is a purpose of this invention to provide a new and useful class of diureas and particularly polyhydroxy diureas which are useful for preparation of resins which are suitable for a variety of purposes such as fibers, films, and coatings and particularly to provide an intermediate compound which combines the advantageous properties of piperazines in producing urethanes for some applications but which does not include the disadvantages of piperazine, namely, a reaction which is too rapid to permit accurate control.

The above and other purposes are achieved by applicant's newly discovered polyhydroxy diureas which are the reaction product of a primary or secondary alkanolamine having at least one functional hydroxyl group with a compound selected from the group consisting of diisocyanates and dicarbonyl chlorides wherein said dicarbonyl chlorides are the reaction product of a primary or secondary diamine with phosgene.

It has been found that the class of diureas of this invention can be reacted with NCO-terminated prepolymers to produce polyurethanes having the desirable properties of those prepared from piperazine and wherein the principal disadvantage of piperazine, i.e., an excessively rapid reaction, is eliminated or substantially reduced. A preferred method for preparing the diurea product of this invention is by reacting a primary or secondary alkanolamine having at least one functional hydroxyl group with a desired diisocyanate in a polar solvent. A judicious choice of the isocyanate permits incorporating varying degrees of flexibility into the polymer, while proper use of the alkanolamine allows potential cross-linking sites to be introduced.

Preferred alkanolamines which may be employed are those having the following generalized formula:

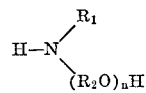

wherein $R_1$ is H or an alkyl, aryl, aralkyl, alkaryl, alicyclic, naphthalenic, heterocyclic or

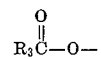

radical, wherein $R_3$ is an alkyl, aryl, aralkyl, alkaryl, alicyclic, naphthalenic, or heterocyclic radical, $R_2$ is an alkyl radical, and $n$ is a whole number of from 1 to 3.

Examples of alkanolamines which may be employed include: monoethanolamine, diethanolamine, methyl ethanolamine, butyl ethanolamine, N-acetyl ethanolamine, phenyl ethanolamine, monoisopropanolamine, and diisopropanolamine.

The isocyanates which can be employed include, for example, polymethylene diisocyanates such as tetramethylene diisocyanate and hexamethylene diisocyanate and aromatic diisocyanates such as 2,4-tolylene diisocyanate, mixtures thereof with 2,6-tolylene diisocyanate usually in proportions of 80% of the 2,4 isomer and 20% of the 2,6 isomer, and referred to herein as mixed isomers of tolylene diisocyanate (80/20:2,4/2,6).

Additional polyisocyanates which may be employed, for example, include:

p,p'-diphenylmethane diisocyanate,
3,3'-dimethyl-4,4'-biphenylene diisocyanate,
3,3'-dimethoxy-4,4'-biphenylene diisocyanate,
3,3'-diphenyl-4,4'-biphenylene diisocyanate,
4-chloro-1,3-phenylene diisocyanate,
3,3'-dichloro-4,4'-biphenylene diisocyanate, and
1,5-naphthalene diisocyanate, and other polyisocyanates in a blocked or semi-inactive form such as the bis-phenylcarbamates of tolylene diisocyanate, p,p'-diphenylmethane diisocyanate, p-phenylene diisocyanate, 1,5-naphthalene and 1,5-tetrahydronaphthalene diisocyanate, and 4,4'-dicyclohexylmethane diisocyanate. The solvents which may be employed include: toluene, tetrahydrofuran, dimethyl formamide, dimethyl sulfoxide, methanol, acetone, and dioxane.

The reaction is generally initiated at room temperature and is an exothermic reaction which is accompanied by a temperature increase which generally is controlled by refluxing. In general, the temperature ranges from about 0 to 100° C. Normally, it requires about 5 to 60 minutes to perform the reaction.

It is possible to vary the proportions of the alkanolamine and diisocyanate over a considerable range. In general, it is preferred to employ stoichiometric equivalent amounts of the isocyanate and alkanolamine although in practical operations the equivalents ratio of isocyanate to alkanolamine may range from about 0.75:1 to 1.25:1.

The diureas of this invention may also be prepared by reacting a primary or secondary diamine with phosgene, employing Schotten-Baumann conditions to form a dicarbonyl chloride, followed by reaction of the dicarbonyl chloride with a primary or secondary alkanolamine which includes at least one functional hydroxyl group in the presence of an acid acceptor to yield the desired polyhydroxy diurea.

More specifically, diamines having the general formulae set forth below:

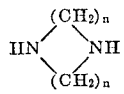

wherein $n$ is a whole number of from 2 to 6 and said compound may be unsubstituted or substituted with aliphatic radicals and $$H_2N-R-NH_2$$

wherein R is H, or alkyl, aryl, alkaryl, aralkyl, alicyclic, naphthalenic, or heterocyclic radical, are reacted with phosgene, followed by reaction with the alkanolamines described above in connection with the isocyanate reaction in the presence of an acid acceptor.

Examples of diamines which may be employed are 2-methylpiperazine, cis-2,5-dimethylpiperazine, trans - 2,5-dimethylpiperazine, ethylene diamine, hexamethylene diamine, tolylene diamine, p,p'-diphenylmethane diamine, 3,3'-dimethyl-4,4'-biphenylene diamine, 3,3' - dimethoxy-4,4'-biphenylene diamine, 3,3' - diphenyl-4,4'-biphenylene diamine, 4-chloro-1,3-phenylene diamine, 3,3' - dichloro-4,4'-biphenylene diamine, 1,5-naphthalene diamine, 1,5-tetrahydronaphthalene diamine, and 4,4' - dicyclohexylmethane diamine.

It is preferred to react the diamine with the phosgene at a temperature of from about 0 to 80° C., and the time required is generally from about ½ to 2 hours. The reaction of the dihalide with the alkanolamine is generally carried out at a temperature from about 0 to 80° C. for about 5 to 60 minutes. Suitable acid acceptors which may be employed for the second step of the reaction include: inorganic bases (NaOH, KOH, etc.), tertiary amines such as triethylamine, pyridine, pyrazine, tributylamine, benzyl dimethylamine, and diethylaniline.

In the above reactions, it is possible to vary the proportions of diamine and phosgene as well as the alkanolamine over a considerable range. In general, it is preferred to employ stoichiometric equivalent amounts of the heterocyclic diamine and phosgene as well as the alkanolamine. For practical purposes, the equivalents ratio of diamine to phosgene may vary from about 0.75:1 to 1.25:1, and the equivalents ratio of diamine to alkanolamine may vary from about 0.75:1 to 1.25:1.

In the above processes, essentially the alkanolamine

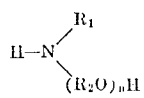

($R_1$, $R_2$ and $n$ are the same as indicated above) reacts with either

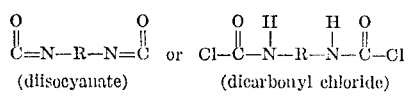

wherein R is H, or an alkyl, aryl, alkaryl, aralkyl, alicyclic, naphthalenic, or heterocyclic radical to produce

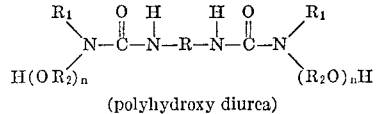
(polyhydroxy diurea)

or with

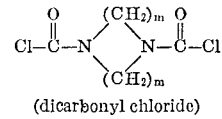
(dicarbonyl chloride)

($m$ is the same as indicated above) to produce

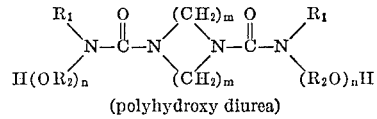
(polyhydroxy diurea)

Thus, the preferred class of polyhydroxy diureas of this invention may be represented by the formula:

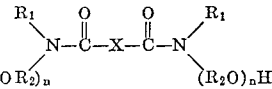

wherein $R_2$ is H, or an alkyl, aryl, aralkyl, alkaryl, alicyclic, naphthalenic, heterocyclic, or

radical, wherein $R_3$ is an alkyl, aryl, aralkyl, alkaryl, alicyclic, naphthalenic, or heterocyclic radical, $R_2$ is an alkyl radical, $n$ is a whole number of from 1 to 3, and X is the unsubstituted radical depicted by the following formula:

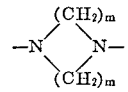

wherein $m$ is a whole number from 2 to 6, the same radical substituted with aliphatic radicals or the radical depicted by the formula:

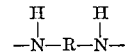

wherein R is H, or an alkyl, aryl, alkaryl, aralkyl, alicyclic, naphthalenic, or heterocyclic radical.

The dicarbonyl chlorides are produced by reacting the primary or secondary diamines with phosgene as follows:

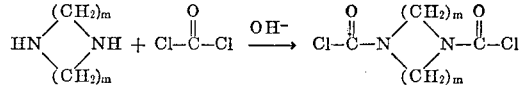

or

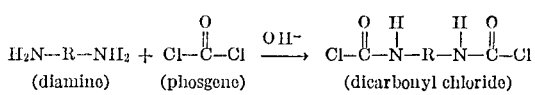
(diamine)  (phosgene)  (dicarbonyl chloride)

(wherein $m$ and R are the same as above).

The above polyhydroxy diureas may be chain extended to produce a polyurethane by compounding the diurea (II) with a desired isocyanate-terminated prepolymer (I), warming sufficiently to permit better blending, generally about 80 to 90° C. for about 10 minutes, and finally increasing the temperature to about 100 to 200° C. for 1 to 2 hours after the material has been cast into a mold or put to other uses. The amount of diurea (II) should be sufficient to react with all the free isocyanate groups in prepolymer (I). For practical purposes, the diurea (II) is preferably employed in amounts to provide an active hydrogen/NCO ratio of from about 0.75:1 to 1.25:1.

The isocyanate-terminated prepolymer (I) employed as a starting material may be any such type compound which may be obtained by the reaction of a selected active hydrogen-containing compound (a) having an average molecular weight of at least about 200 with a stoichiometric excess of an organic polyisocyanate (b). Such prepolymers are capable of molecular weight increase through chain extension with chain extension agents.

In general, any organic compound containing at least 2 active hydrogen atoms may be reacted with a stoichiometric excess of an organic polyisocyanate to get a prepolymer or an initial addition product, which is then capable of a molecular weight increase through chain extension with a chain extender. Active hydrogen-containing compounds of this sort include the polyalkylene ether glycols, the poly(alkylene ether-alkylene thioether) glycols, polyalkylene esters of alkylene diacids, polyalkylene esters of arylene diacids, esters of polyhydric alcohols and hydroxy fatty acids, alkyd resins containing hydroxyl or carboxyl end groups and polyester amide resins. The term "active hydrogen atoms" refers to hydrogens which, because of their position in the molecule, display activity according to the Zerewitinoff test as described by Kohler in J. Am. Chem. Soc., 49, 3181 (1927). Linear compounds containing hydrocarbon groups linked together by ether or ester linkages and having terminal hydroxyl groups are preferred representatives of this type of compound. A particularly useful class of active hydrogen-containing compounds for this purpose is the polyalkylene ether glycols which have the general formula $H(OR)_nOH$ where R is an alkylene radical and $n$ is an integer which in a preferred embodiment is sufficiently large that the compound as a whole has a molecular weight of at least about 300. Molecular weights of up to 10,000 are satisfactory. Polyethylene ether glycols, poly-1,2-propylene ether glycol, polytetramethylene ether glycol, poly-1,2-dimethylene ether glycol, and polydecamethylene ether glycols are typical members of this class. Not all of the alkylene radicals present need to be the same. Glycols containing a mixture of radicals as in the compound $HO(CH_2OC_2H_4O)_nH$, or $$HO(C_2H_4O)_n(C_3H_6O)_m(C_2H_4O)_nH$$

wherein $n$ and $m$ are together sufficient for attainment of the desired molecular weight can be used. Polyethylene ester-polypropylene ether glycols, having the above-indicated formula, are among the preferred glycols.

Any of a wide variety of organic isocyanates (b) may be employed in the reaction, including aromatic, aliphatic, and cycloaliphatic diisocyanates and combinations of these types. Representative compounds include the isocyanates listed above with respect to the reaction of alkanolamines with diisocyanate.

In the preparation of the starting prepolymer (I), an excess of the organic polyisocyanate (b) over the active hydrogen-containing compound (a) is used. The ratio of organic polyisocyanate compound (b) to active hydrogen-containing compound (a) is preferably such that the NCO/OH ratio is greater than about 1.3:1. While there is no upper limit to the NCO/OH ratio for practical purposes, a ratio greater than about 2.75:1 is seldom employed.

The reaction may be effected in the absence of a solvent when the prepolymer (I) is a fluid at processing temperatures. When it is not, or when it is desired to employ a solvent, convenient solvents are inert organic solvents having a boiling range above about 100° C. when the reaction is to be carried out in open equipment.

The solvents to be used are preferably those in which the reactants have some solubility but in which the final chain-extended product is insoluble. Ketones, tertiary alcohols, and esters may be used.

Toluene and isopropyl acetate are preferred solvents. The amount of solvent used may be varied widely. Any amount of solvent up to about 100 parts of solvent per 100 parts of prepolymer has been found to be operable.

The excess solvent, where large amounts are employed, may be separated partially or completely from the polymer prior to emulsification in the water solution. Sometimes the excess solvent is useful and is allowed to remain during the emulsification stage.

The active hydrogen-containing compound and the isocyanate are ordinarily reacted by heating with agitation at a temperature of about 50 to 130° C. without a catalyst or at about 25 to 60° C. where a catalyst such as stannous octoate is employed. The reactants are heated for a period sufficient to react most, if not all, of the hydroxy groups, whereafter the prepolymer is allowed to stand and the free NCO content determined. A period of from about 1 to 3 hours is preferred when a catalyst is not employed, whereas a period of from about 10 minutes to 3 hours is preferred when a catalyst is employed.

Usual pHs are employed during preparation of the prepolymer, the reaction preferably being maintained substantially neutral. Bases accelerate the reaction, acids retard the reaction, and preferably neither are added.

The following examples are given to illustrate the invention.

EXAMPLE 1

In a one-liter, round-bottom flask equipped with a stirrer, thermometer, and dropping funnel, 10 grams (0.1 mole) of 2-methylpiperazine were dissolved in 90 ml. of water to which 8 grams (0.2 mole) sodium hydroxide in 25 ml. of water were added and the solution cooled to 10° C. with an ice water bath. 20 grams of phosgene (0.2 mole) dissolved in 100 ml. of toluene, precooled to 5° C., were then added through the dropping funnel with vigorous stirring over a period of 30 minutes. No appreciable temperature increase was observed. The mixture was stirred for one additional hour, and the toluene layer separated and removed by decanting. The aqueous layer was extracted once with 50 ml. of toluene and the combined organic layer dried overnight over anhydrous magnesium sulfate.

After decanting, the solvent was stripped and the remaining material recrystallized from diethyl ether to give 14 grams (63.5% yield) of the dicarbonyl chloride which melted at 85 to 86° C.

11.2 grams (0.05 mole) of the above product (2-methylpiperazine dicarbonyl chloride) were dissolved in 125 ml. of tetrahydrofuran and mixed with 6.1 grams (0.10 mole) of ethanolamine which was also dissolved in 125 ml. of tetrahydrofuran. The temperature increased from room temperature to 38° C. and a gummy precipitate formed at once. The mixture was allowed to stand overnight, after which the precipitate was filtered off and the ether solvent evaporated to yield 9 grams (66% yield) of a viscous oil. The product showed definite urea structure by infrared analysis in addition to evidence for the piperazine ring structure, hydroxyl, and NH, all of which are consistent with a product having the following structure:

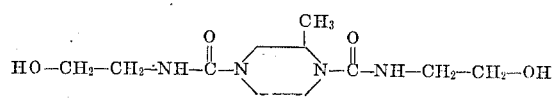

EXAMPLES 2–7

A series of six polyhydroxy diureas were prepared by reacting the isocyanates and alkanolamines set forth in Table I following in the amounts set forth in Table I. In these examples the isocyanate was dissolved in the solvent for the isocyanate and added to a solution of the alkanolamine dissolved in its solvent in a one-liter resin kettle provided with a stirrer, water-cooled condenser, and addition funnel. The solvents employed and quantities thereof are set forth in Table I below. The isocyanate solution was added through the addition funnel over a period of four minutes, accompanied by vigorous stirring. During the addition, the temperature increased to 14° C. above room temperature. After addition, the solution was stirred for an additional 15 minutes and about half the solvents were then removed using steam bath temperatures and approximately 20 millimeters of mercury pressure. The solution was then cooled to room temperature and a white powder formed which was filtered, washed with methylene chloride, and dried. Properties of the products produced are shown in Table II below.

TABLE III.—CHAIN EXTENSION WITH POLYHYDROXY DIUREAS

| Diurea | | | Prepolymer | | |
|---|---|---|---|---|---|
| Obtained from Example No. | M.W. | Eq. wt. of urea | No. | Percent NCO | Grams urea |
| 5 | 294.4 | 147.4 | 1 | 5.20 | 18.2 |
| 4 | 324.4 | 162.2 | 1 | 5.20 | 20.1 |
| 3 | 412.6 | 206.3 | 1 | 5.20 | 25.5 |
| 2 | 460.5 | 115.1 | 2 | 6.67 | 9.2 |
| 6 | 296.3 | 148.1 | 2 | 6.67 | 12.0 |
| 7 | 516.6 | 104.2 | 1 | 5.20 | 12.9 |
| 6 | 296.3 | 148.1 | 1 | 5.20 | 18.3 |
| 4 | 324.4 | 162.2 | 2 | 6.67 | 25.7 |
| 2 | 460.5 | 115.1 | 2 | 6.67 | 9.2 |
| 6 | 296.3 | 148.1 | 2 | 6.67 | 12.0 |

TABLE I

| Example Number | Isocyanate | Grams | Solvent for isocyanate, ml. | Amine | Grams | Solvent for amine | Yield, grams | Percent | Hydroxyl functionality |
|---|---|---|---|---|---|---|---|---|---|
| 2 | MDI [1] | 100 | THF,[4] 500 | Diethanol | 94 | Isopropanol, 200 ml | 172 | 93.5 | 4 |
| 3 | MDI [5] | 264 | Toluene, 250 | N-methylethanol | 165 | Toluene, 2 liters | 210 | 50 | 2 |
| 4 | TDI [3] | 174 | Dioxane, 350 | do | 165 | Dioxane, 946 ml | 260 | 80 | 2 |
| 5 | HDI [2] | 252 | | do | 247 | Methanol, 1 liter | 438 | 100 | 2 |
| 6 | TDI | 348 | | Ethanol | 244 | Isopropanol, 4.5 liters | 502 | 95 | 2 |
| 7 | MDI | 100 | Acetone, 500 | Diisopropyl | 106 | Methanol, 500 ml | 207 | 100 | 4 |

[1] MDI=4,4'-diphenylmethane diisocyanate.
[2] HDI=1,6-hexamethylene diisocyanate.
[3] TDI=tolylene diisocyanate (2,4/2,6 80/20).
[4] THF=tetrahydrofuran.
[5] Hydrogenated.

TABLE II.—PROPERTIES OF POLYHYDROXY DIUREAS

| Example Number | M.P., ° C. | M.W. | Hydroxyl Number | Percent nitrogen Calc. | Percent nitrogen Found | Equivalent weight |
|---|---|---|---|---|---|---|
| 2 | 140–42 | 460.5 | 486 | 12.17 | 12.40 | 115.1 |
| 3 | 155–60 | 412.6 | 279 | 13.58 | 13.62 | 206.3 |
| 4 | Amorphous | 324.4 | 364 | 17.27 | 17.16 | 162.2 |
| 5 | 96–102 | 294.4 | 341 | 19.03 | 17.14 | 147.4 |
| 6 | 196–200 | 296.3 | 369 | 18.91 | 18.80 | 148.1 |
| 7 | Amorphous | 516.6 | 481 | 10.84 | 10.58 | 104.2 |

The hydroxyl number in Table II was determined by the method set forth by Gutnikov and Schenk in Analytical Chemistry, vol. 34, pg. 1316.

The percent nitrogen was determined by the method set forth in ASTM E 1148–59T.

Prepolymer No. 1 in the above Table III is a reaction product of tolylene diisocyanate with a mixture of 1300 molecular weight polyoxypropylene glycol and 675 molecular weight polyoxypropylene glycol in a proportion of 1 part by weight 675 molecular weight glycol and 10 parts by weight 1200 molecular weight glycol, the prepolymer having an NCO:OH ratio of 2:1.

Prepolymer No. 2 in Table III is a reaction product of tolylene diisocyanate with a mixture of 425 molecular weight polyoxypropylene glycol and 675 molecular weight polyoxypropylene glycol in molar proportions of 1:1, the prepolymer having an NCO:OH ratio of 1.75:1.

Physical properties of the polyurethanes prepared by the above chain extension of polyhydroxy diureas are shown in Table IV below.

TABLE IV.—PHYSICAL PROPERTIES OF POLYURETHANE POLYMERS CHAIN EXTENDED WITH POLY HYDROXY DIUREAS

| Diurea from Example No. | Prepolymer | Temperature 80–90° C. | Temperature 150° C. | Remarks |
|---|---|---|---|---|
| 5 | 1 | Two phase | Homogeneous | Brown color, clear, elastomeric. |
| 4 | 1 | Milky | do | Very light tan, slight tack, clear, elastomeric. |
| 3 | 1 | Two phase | do | Very light tan, slight, surface tack, clear, elastomeric. |
| 2 | 2 | Milky | Slight haze | White opaque, no tack, insoluble in DMF [2] crosslinked. |
| 6 | 2 | Two phase | do | Light tan elastomer, clear, slight tack. |
| 7 | 1 | do | do | Tan, insoluble in DMF, crosslinked. |
| 6 | 1 | do | Some insol | Milky appearance, elastomeric. |
| 4 | 2 | do | do | Light tan, clear. |
| 2 and 6 [1] | 2 | do | do | Light tan, crosslinked. |

[1] 1:1 mixture.
[2] DMF=Dimethyl formamide.

EXAMPLES 8–17

Various polyhydroxy diureas prepared in accordance with Examples 2–7 were chain extended by mixing the diureas and prepolymers set forth in Table III below, along with a stannous octoate catalyst in a 500 ml. beaker. The charge contained 100 grams of prepolymer, the amounts of diurea shown in Table III, and 0.04 milliliter of stannous octoate catalyst. The mixtures were warmed to 80 to 90° C. for 10 minutes in a circulating hot air oven, after which the temperature was increased to 150° C. and the material cast into a circular mold having a 6-inch diameter and ¼-inch depth which was heated at a temperature of 150° C. for a period of two hours.

While there has been shown and described hereinabove the present preferred embodiments of this invention, it is to be understood that various changes, alterations, and modifications can be made thereto without departing from the spirit and scope thereof as defined in the appended claims.

What is claimed is:

1. A composition of matter which is the reaction product of
   (I) prepolymer having terminal NCO groups which is the reaction product of
      (a) active hydrogen-containing compound with
      (b) organic polyisocyanate, and (II) polyhydroxy diurea prepared by reacting in a polar solvent in substantially stoichiometric proportions at a temperature ranging from about 0 to 100° C. for a period of time of about 5 to 60 minutes
  (a) alkanolamine selected from the group consisting of primary and secondary alkanolamines having at least one functional hydroxyl group with
  (b) compound selected from the group consisting of
    (1) diisocyanates and
    (2) dicarbonyl chlorides which are the reaction product of diamine selected from the group consisting of primary and secondary diamines with phosgene at a temperature of about 0 to 80° C. for a period of time of about one-half to two hours.

References Cited
UNITED STATES PATENTS

| | | | |
|---|---|---|---|
| 3,248,373 | 4/1966 | Barringer | 260—77.5 |
| 3,377,316 | 4/1968 | Reinking et al. | 260—47 |

DONALD E. CZAJA, Primary Examiner

H. S. COCKERAM, Assistant Examiner

U.S. Cl. X.R.

260—77.5 SP